(12) United States Patent
Ishida

(10) Patent No.: US 6,266,364 B1
(45) Date of Patent: Jul. 24, 2001

(54) DATA PROCESSOR FOR GENERATING SPREAD CODES

(75) Inventor: Kenji Ishida, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/100,674

(22) Filed: Jun. 19, 1998

(30) Foreign Application Priority Data

Jun. 20, 1997 (JP) .................................................. 9-164681

(51) Int. Cl.[7] .................................................. H04B 1/707
(52) U.S. Cl. ........................ 375/142; 375/149; 375/150
(58) Field of Search ................................... 375/142, 145, 375/150, 148, 149

(56) References Cited

U.S. PATENT DOCUMENTS

| | | | |
|---|---|---|---|
| 5,699,380 | * 12/1997 | Sugita | 375/150 |
| 6,088,382 | * 7/2000 | Maru | 375/148 |
| 6,088,383 | * 7/2000 | Suzuki et al. | 375/148 |

FOREIGN PATENT DOCUMENTS

| | | | |
|---|---|---|---|
| 0704987 | * 4/1996 | (EP) | 375/150 |
| 59-10048 | 1/1984 | (JP) . | |
| 8-97799 | 4/1986 | (JP) . | |
| 2-98242 | 4/1990 | (JP) . | |
| 4-192733 | 7/1992 | (JP) . | |

* cited by examiner

Primary Examiner—Salvatore Cangialosi
(74) Attorney, Agent, or Firm—Ostrolenk, Faber, Gerb & Soffen, LLP (57) ABSTRACT

A shift register 22 is normally generating recurrence spreading codes and, when actual state data of the shift register 22 and the state data stored in the reset data register, initial data stored in the initial data register 24 beforehand is fed to the shift register 22. As a result, the shift register 22 is initialized and generates recurrence spreading codes. No counter need determine the timing of restoration of the shift register 22 to the initial state, and thus no spreading code phase deviation due to any count deviation occurs. Thus, preventing phase deviation of spreading codes utilized for spread and despread of communication data.

16 Claims, 2 Drawing Sheets

DATA PROCESSOR FOR GENERATING SPREAD CODES

BACKGROUND OF THE INVENTION

The present invention relates to data processors for generating spread codes which are utilized for spreading and despreading the data in CDMA (Code Division Multiple Access) system, data transmitters, data receivers and data communication systems utilizing such data processors, methods of data processing in such data processors, and data recording media in which programs for causing computers to execute such data processing methods are stored.

A CDMA system is a well-known data communication technique. In the CDMA data communication system, the data transmitter modulates communication data with spread codes, such as PN (Psuedo Noise) codes to despread the frequency band of the data to several to several ten times before transmitting the data. The data receiver demodulates the received communication data through despreading with the same spread codes.

Such a CDMA system data communication system has a merit that the S/N (signal-to-noise) ratio is satisfactory because noise irrelevant to the spread codes is not modulated. Another merit of the system is that the confidential property is satisfactory because the receiving side cannot demodulate communication data unless the spread codes are the same as those on the transmitting side.

With different spread codes, it is possible to let a plurality of different communication data be coexistent in the same frequency band, thus obtaining high data transmission band utilization efficiency of data communication. However, it has also been proposed a technique of permitting further effective utilization of the data transmission band of such a CDMA system by permitting variation of the spread bandwidth according to the chip rate of communication data.

In the above CDMA system data communication system, unless the spread codes in the data transmitter and those in the data receiver are coincident, the data receiver cannot despread communication data which has been obtained by the spreading in the data transmitter. Accordingly, the spread codes in the data transmitter and those in the data receiver are synchronized to one another.

In this case, the data transmitter first successively changes the phases of the spreading codes to synchronize the phases with those of the spreading codes in the data receiver, and subsequently synchronization is maintained such that the data transmitter and the data receiver cause recurrence of spreading codes of the same series in a fixed cycle. As an example of data processor which utilizes such spreading codes, a data receiver disclosed in Japanese Laid-Open Patent Publication No. 4-192733 will now be described with reference to FIG. 2.

Figure 2:
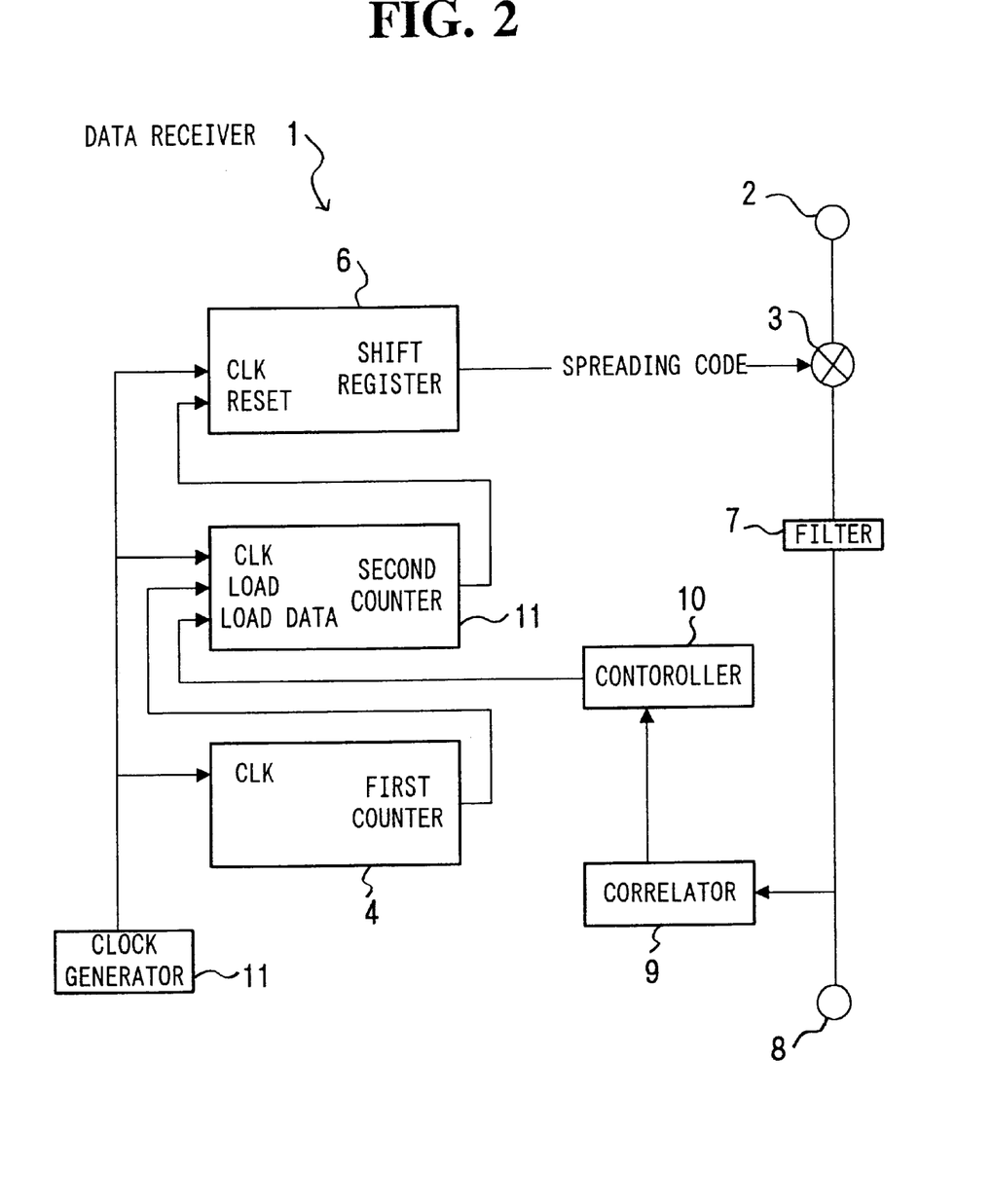
FIG. 2 is a block diagram of a prior art data receiver.

The illustrated data receiver 1 has an input terminal 2, to which spread spectrum communication data is coupled. The input terminal 2 is connected to one of pair input terminals of a despread circuit 3. The data receiver 1 also has a first and a second counter 4 and 5 connected in sequence. The second counter 5 is connected to a reset terminal of a shift register 6 for generating spreading codes.

The shift register 6 is connected to the other one of the pair input terminals of the despreading circuit 3. A bandpass filter 7 is connected to an output terminal of the despreading circuit 3. A despread communication data output terminal 8 and a correlator 9 for checking the correlation of transmitting and receiving side spreading codes are connected to the band-pass filter 7. A controller 10 constituted by a microcomputer is connected to the correlator 9. A clock generator 11 constituted by a voltage-controlled oscillator is commonly connected to the first and second counters 4 and 5 and the shift register 6.

When the communication data transmitted as spectrum spread modulation thereof with spreading codes from a data transmitter (not shown), the data receiver 1 having the above construction receives the transmitted communication data, and demodulates the data through the despread thereof with the same spreading codes.

The first and second counters 4 and 5 and the shift register 6 are operated in synchronism to a reference clock generated by the clock generator 11, and the first counter 4 counts reference clock pulses from the clock generator 11 and outputs a pulse signal corresponding to the recurrence cycle of the spreading codes.

The controller 10 outputs initial count value for spreading code recurrence start timing control to the second counter 5. The second counter 5 receives the initial count (value) from the controller 10 based on the pulse signal fed from the first counter 4.

The second counter 5 counts reference clock pulses from the initial count input, and feeds a reset signal corresponding to the recurrence cycle of the spreading codes to the shift register 6. The shift register 6 is reset by the reset signal to start generation of recurrence spreading codes. With the spreading codes, the recurrence of which is started at a particular timing, the despreading circuit 3 demodulates the spread data by the despreading.

The demodulated communication data is filtered through the band-pass filter 7 and then fed to the correlator 9. The correlator 9 checks the correlation of the spreading codes of the data transmitter and data receiver. On the basis of the check, the controller 10 generates the initial count data.

In the data receiver 1 as described, the phase of the recurrence spreading codes can be updated as desired, because the spreading code recurrence start timing is changed on the basis of the initial count data generated from the controller 10.

However, in the above data receiver 1 the spreading code recurrence start timing is generated on the basis of the counts of the two counters 4 and 5. Therefore, the reset timing of the shift register 6 is changed when a count error is generated in at least one of these counters 4 and 5.

Such reset timing change may occur particularly with a long spreading code series. In such a case, the spreading code recurrence start timing is also changed, thus resulting in failure of coincidence of the spreading codes of the data receiver 1 and the data transmitter, and making it impossible to decode the communication data.

As noted before, it has been proposed to vary the spectrum spread bandwidth in a CDMA system data communication system by varying the length of the spreading code series according to the chip rate of communication data. However, it is difficult to apply this to the above data receiver 1.

More specifically, in the above data receiver 1 the first counter 4 controls the timing when the second counter 5 receives the initial count data, and the number of stages of the second counter 5 represents the length of the spreading code series. In order to update the length of the spreading code series, it is necessary to control the counts of both the first and second counters 4 and 5. This control is cumbersome and dictates complicated circuitry.

Besides, in the above data receiver 1 updating of the counts of both the first and second counters 4 and 5 is necessary when synchronizing the phase of recurrence of the spreading codes to the received communication data. Therefore, the synchronization of the spreading codes is delayed. Such a delay is pronounced in the case of high communication data chip rate and long spreading code series. In actual communication, this results in failure of demodulation of forefront part of the communication data.

SUMMARY OF THE INVENTION

The present invention was made in view of the above problems, and it has an object of providing a data processor, which aims at spreading code recurrence start timing variation suppression and readily variable spreading code series length, and fast change of the recurrence spreading code phase as well as a data transmitter, a data receiver and a data communication system utilizing such a data processor, a method of data processing in such a data processor and a data storing medium, in which programs for causing a computer to execute such a data processing method are stored.

According to an aspect of the present invention, there is provided a data processor comprising: a shift register for generating recurrence spreading codes; an initial data register, in which initial data for causing the shift register to generate a forefront spreading code in a recurrence spreading code series is stored beforehand; a preset data register for updatably and tentatively storing preset data for causing the shift register to generate a particular spreading code; a reset data register, in which state data of the shift register when restoring the forefront of the recurrence spreading code series is stored beforehand; a selector for selectively supplying the initial data stored in the initial data register and the preset data stored in the preset data register to the shift register; a comparator for comparing the state data stored in the reset data register and actual state data of the shift register; a timing generator for controlling, when the two compared state data coincide, the selector for causing the initial data stored in the initial data register to be supplied to the shift register; and a controller for causing state data to be generated and stored in the reset data register, causing initial data to be stored in the initial data register, causing preset data to be generated and stored in the preset data register, and then causing the timing generator to feed the stored reset data to the shift register.

According to another aspect of the present invention, there is provided a data processor comprising: code generating means for generating recurrence spreading codes; initial data memory means for storing initial data for causing the code generating means to generate a forefront spreading code in a recurrence series of spreading codes; reset data memory means, in which state data of the code generating means when restoring the forefront of the recurrence series of spreading codes is stored beforehand; generation starting means for causing, when the state data stored in the reset data storing means and actual state data of the code generating means coincide, the initial data stored in the initial data memory means to be fed to the code generating means; reset data storing means for generating state data in correspondence to predetermined conditions and storing the state data in the reset data memory means; initial data storing means for storing initial data in the initial data memory means; preset data generating means storing preset data in correspondence to predetermined conditions and causing the generated preset data to be stored in the preset data storing means; and generation control means for causing preset data stored in the preset data storing means to be fed to the code generating means with a variable timing.

According to other aspect of the present invention, there is provided a method of data processing in a data processor comprising code generating means for generating recurrence spreading codes comprising the steps of: preserving beforehand initial data for causing the code generating means to generate a forefront spreading code in a recurrence series of spreading codes and state data of the code generating means when restoring the forefront of the recurrence series of spreading codes; causing, when the preserved state data and actual state data of the code generating means coincide, the preserved initial data to be fed to the code generating means; generating preset data for causing the code generating means to generate a particular spreading code in correspondence to predetermined conditions; and causing the generated preset data to be fed to the code generating means with a variable timing after tentatively preserving the generated preset data.

According to still other aspect of the present invention, there is provided a medium having a program for executing the method as set forth in the foregoing.

Other objects and features will be clarified from the following description with reference to attached drawings.

PREFERRED EMBODIMENTS OF THE INVENTION

Figure 1:
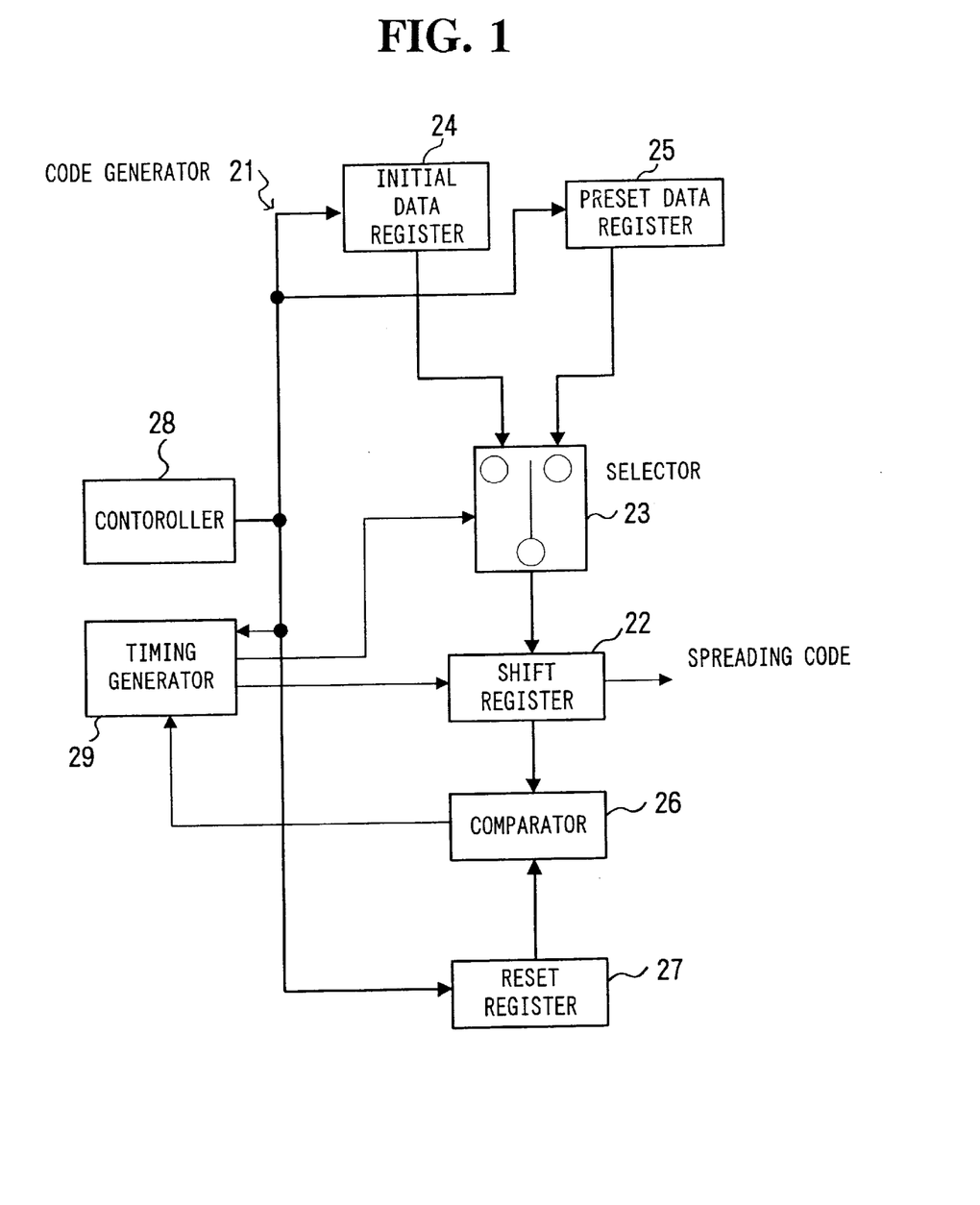
FIG. 1 is a block diagram of a code generator according to an embodiment of the present invention.

Preferred embodiments of the present invention will now be described will now be described. FIG. 1 shows a block diagram of a code generator 21 according to an embodiment.

Referring to FIG. 1, the code generator 21 is also provided as part of a data receiver (not shown) of a data communication system. The data receiver is provided together with a data transmitter in a data communication system (not shown). In this data communication system, the data transmitter transmits communication data by spreading the data with spreading codes, and the data receiver demodulates the received communication data by despreading the data with spreading codes generated by the code generator 21.

The code generator 21 comprises a shift register 22 serving as code generating means for generating recurrence spreading codes. An output terminal of a selector 23 is connected to the shift register 22. The selector 23 has a pair of input terminals, to which an initial data register 24 as initial data storing means and a preset data register 25 as preset data storing means are connected, respectively.

In the initial data register 24, initial data for causing the shift register 22 to generate the forefront spreading code of the series is updatably stored beforehand. The preset data register 25 updatably and tentatively stores the preset data for causing the shift register 22 to generate a particular spreading code.

The shift register 22 is also connected to one of pair input terminals of a comparator 26, and a reset data register 27 serving as reset data storing means is connected to the other input terminal of the comparator 26. In the reset data register 27, the state data of the shift register 23 when restoring the forefront of the recurrence spreading code series is updatably stored beforehand.

A controller 28 is connected to input terminals of the above three different registers 24, 25 and 27. Output terminals of the controller 28 and the comparator 26 are connected to the timing generator 29. The timing generator 29 is connected to control terminals of the selector 23 and the shift register 22.

The selector 23 is set such that in a default state it connects the initial data register 24 to the shift register 22. Data stored in the registers 24 and 25 selected by the selector 23 are fed to the shift register 22 under control of a control signal provided from a timing generator 29.

The control signal is provided at a variable timing, and in this embodiment it has a hierarchical structure. For example, several ten to several hundred groups of symbols each constituting as least data signal unit constitute a slot as second unit, several ten slots form a fame as third unit, and the timing generator 29 provides the control signal for controlling the shift generator 22 in units of frames.

The timing generator 29 also generates a reference clock and feeds the clock to the shift register 22. The shift register 22 executes a shifting operation under control of the reference clock to successively generate recurrence spreading codes.

The controller 28 consists of a micro-computer with appropriate programs mounted as software, and executes various processes according to the programs to realize various functions as respective means. The code generator 21 of the embodiment realize various functions as respective means on the basis of the above various hardware connection relations and settings.

As such various means, the code generator 21 in this embodiment has generation starting means, and the controller 28 includes reset data storing means, initial data storing means, preset data generating means, reset data updating means, etc.

The generation starting means is served by the comparator 26 for comparing the state data stored in the reset data register 27 and actual state data of the shift register 22. When the two compared data coincide, the initial data stored in the initial data register 24 is fed to the shift register 22 under control of the timing generator 29.

The reset data storing means of the controller 28 generates the state data in correspondence to predetermined conditions. The generated state data is stored in the reset data register. The initial data storing means stores the initial state in the initial data register 24. The preset data generating means generates the preset data in correspondence to predetermined conditions. The generated preset data is stored in the preset data register 25.

In greater details, the code generator 21 in this embodiment is utilized for a data receiver as mentioned before. In the data receiver, a receiver circuit or like data input receiving means receives the input of communication data having been spread with spreading codes, and a despreading circuit or like despreading means despreads the input communication data with spreading codes generated by the shift register 22. At this time, a correlator or like phase detecting means detects the phase of recurrence of the spreading codes of the input communication data, and preset data generating means of the controller 28 thus generates preset data for causing the shift register 22 to generate spreading codes synchronized in phase to the spreading codes of the input communication data. The generated preset data is stored in the preset data register 25.

When the preset data is stored in the preset data register 25 under control of the controller 28 as described above, the timing generator 29 causes the selector 29, which is connected to the initial data register 24 in the default state, to he preset data register 25, thus causing the preset data to be fed to the shift register 22.

The preset data is thus fed from the preset data register 25 to the shift register 22 at a timings of generation of spreading codes synchronized in phase to the spreading codes of the received communication data. The function described above is thus realized by the circuits 28 and 29 as generation control means in the code generator 21.

In the data receiver, a chip rate detector or like chip rate detecting means detects the chip rate of the received communication data, so that the reset data updating means updates the state data stored in the reset data register 27 in correspondence to the detected chip rate.

In the above construction, the code generator 21 functions as part of the data receiver, and the data receiver functions together with a data transmitter as part of a data communication system. In this case, the data transmitter transmits the communication data after spreading the data with spreading codes, and the data receiver demodulates the received communication data by despreading the data with spreading codes generated from the code generator 21. Here, in the state of establishment of the spreading codes of the data transmitter and the data receiver, the code generator 21 need only repeatedly generate recurrence spreading codes, and the shift register 22 generates the recurrence spreading codes under control of the reference clock provided from the timing generator 29.

The comparator 26 compares actual state data of the shift register 22 and the state data stored in the reset data register 27. When the two compared data are found to be coincident, the initial data stored in the initial data register 24 is fed from the timing generator 29 to the shift register 22.

The shift register 22 is thus initialized to generate the spreading codes from the forefront of the series. Thus, spreading codes recurrence with a predetermined series length are provided repeatedly. The received communication data thus provided is despread and demodulated.

As described above, in the code generator 21, the restoration of the shift register to the initial state is controlled according to the data stored in the reset data register 27 and the shift register 22. Thus, it is possible to obtain accurate demodulation of the communication data with the spreading codes without possibility of generation of phase deviation of the spreading codes due to any count deviation of any counter.

When the data receiver receives the communication data by spread from the data transmitter, the code generator 21 should provide the spreading codes at a particular timing from an intermediate location of the series because of absence of synchronization in the initial state. Accordingly, the data transmitter detects the phase of recurrence of the spreading codes of the received communication data. In the code generator 21, the controller 28 causes appropriate preset data corresponding to the detected phase to be generated and stored in the preset data register 35, and the timing generator 29 causes the stored preset data to be fed at a proper timing to the shift register 22.

The shift register 22 thus generates a spreading code synchronized in phase to a spreading code of the input communication data. Subsequently, like the previous case, the shift register 22 repeatedly generates recurrence spreading codes according to the data stored in the reset data register 27 and the initial data register 24.

In the code generator 21, as described before, the phases of the spreading codes generated by the shift register can be updated as desired, and this is realized by the arithmetic operations in the controller 28 and the storing of data in the preset data register 25. It is thus possible to fast generate spreading codes of desired phases at desired timings and in a simple process without need of controlling any count in any counter.

Furthermore, in a data communication system utilizing the code generator 21, a function of permitting further effective utilization of the transmission bandwidth is realized by emitting variation of the spread bandwidth according to the chip rate of communication data. To this end, the data receiver detects the chip rate of the received communication data, and in the code generation 21 in this embodiment the controller 28 causes updating of the state data stored in the reset data register 27 according to the detected chip rate.

When the state data of the shift register becomes coincident with the state data of the reset data register 27 thus updated, the shift register 22 is restored to the initial state. When the state data of the reset data register 27 is updated, the length of the recurrence spreading code series is also updated. In this way, communication data of various chip rates can be properly despread.

The above embodiment of the present invention is by no means limitative, and various changes and modifications are possible without departing from the gist of the present invention. For example, while the above embodiment the data processor according to the present invention is utilized for despreading communication data by providing a data receiver, it is also possible to utilize the above code generator for a data transmitter.

Also, while it has been shown as an example to realize substantially all of the various means for various functions of the above embodiment, it is also possible to provide adequate programs as software in a micro-computer, to which the shift register 22 and other circuits are connected.

In this case, in a data storing medium for providing software to the micro-computer may be stored programs for causing the micro-computer to execute, for instance, preservation of initial data and state data in memories or the like, feeding of preserved initial data to the shift register 22 upon occurrence of coincidence of the preserved state data and actual state data of the shift register 22, generation of preset data causing the shift register 22 to generate particular spreading codes in correspondence to predetermined conditions and feeding the generated present data to the shift register 22 at variable timings after tentatively preserving the data.

For providing software from the data storing medium to the micro-computer such as above, it is possible that the software is written beforehand in a FD or a CD-ROM or the like as data storing medium, which can be solely dealt, and installed from the FD or the like to a RAM or the like. As an another example, the micro-computer may directly read out software from the FD or the like without executing the installing before executing the processing.

More specifically, when realizing the various means of the data processor according to the present invention with software, the software may be in a state such that it permits the micro-computer to read programs and execute corresponding operations. It is further possible to provide control programs for realizing the above various means as a combination of a plurality of different software pieces. In this case, the sole least necessary software may be stored for realizing the data processor according to the present invention.

For example, in the case where application software is provided via a CD-ROM or like data storing medium to a computer system with an existing operating system mounted therein, software for realizing the various means of the data processor according to the present invention may be realized by combining the application software and the operating system, and it is thus possible to omit part of the software that is dependent on the operating system from the application software of the data storing medium.

Now, basic features, structures and advantages of the present invention will be summarized as follows:

(1) A data processor comprising: a shift register for generating recurrence spreading codes; an initial data register, in which initial data for causing the shift register to generate a forefront spreading code in a recurrence spreading code series is stored beforehand; a preset data register for updatably and tentatively storing preset data for causing the shift register to generate a particular spreading code; a reset data register, in which state data of the shift register when restoring the forefront of the recurrence spreading code series is stored beforehand; a selector for selectively supplying the initial data stored in the initial data register and the preset data stored in the preset data register to the shift register; a comparator for comparing the state data stored in the reset data register and actual state data of the shift register; a timing generator for controlling, when the two compared state data coincide, the selector for causing the initial data stored in the initial data register to be supplied to the shift register; and a controller for causing state data to be generated and stored in the reset data register, causing initial data to be stored in the initial data register, causing preset data to be generated and stored in the preset data register, and then causing the timing generator to feed the stored reset data to the shift register.

Normally, the shift register thus generates recurrence spreading codes, and its actual state data and the state data stored in the reset data register are compared in the comparator. When the two compared state data coincide, the selector which is controlled by the timing generator feeds initial data stored beforehand in the initial data register to the shift register, thus initializing the shift register to generate the recurrence spreading codes from the forefront of the series.

That is, when its state data becomes coincident with the content stored in the reset data register, the shift register is restored to the initial state, so that the length of the spreading code series can be set as desired according to the reset data register state data. The restoration of the shift register to the initial sate is controlled according to the data stored in the reset data register and the initial data register, and it is thus not necessary for any counter to determine the timing of the restoration of the shift register to the initial state.

When generating spreading codes from an intermediate locality of the series or then shifting the phase of the recurrence spreading codes, the controller causes proper preset data to be generated and stored in the preset data register and causes the timing generator to feed the preset data thus stored in the preset data register to the shift register.

In this case, the shift register generates a spreading code corresponding to preset data at a timing when the preset data is fed to it, and it thus subsequently generates recurrence spreading codes successively. Since proper preset data are generated and fed at proper timings to the shift register, it is not necessary to control the counts of the counters for the spreading code phase control.

The restoration of the shift register to the initial state thus can be controlled according to the data stored in the reset data register and the initial data register. It is thus possible to prevent phase deviation of spreading codes due to count deviation in any counter without need of determination of the timing of restoration of the shift register to the initial state by any counter. It is also possible to permit variation of the phases of the spreading codes by causing the timing generator to feed the preset data generated by the controller to the shift register after storing the data in the preset data register. The spreading code phase thus can be varied without need of controlling any count of any counter, and fast spreading code phase control can be obtained in a simple processing.

(2) A data processor comprising: code generating means for generating recurrence spreading codes; initial data memory means for storing initial data for causing the code generating means to generate a forefront spreading code in a recurrence series of spreading codes; reset data memory means, in which state data of the code generating means when restoring the forefront of the recurrence series of spreading codes is stored beforehand; generation starting means for causing, when the state data stored in the reset data storing means and actual state data of the code generating means coincide, the initial data stored in the initial data memory means to be fed to the code generating means; reset data storing means for generating state data in correspondence to predetermined conditions and storing the state data in the reset data memory means; initial data storing means for storing initial data in the initial data memory means; preset data generating means storing preset data in correspondence to predetermined conditions and causing the generated preset data to be stored in the preset data storing means; and generation control means for causing preset data stored in the preset data storing means to be fed to the code generating means with a variable timing.

Normally, the code generating means thus generates recurrence spreading codes, and its actual state data and the state data stored in the reset data memory means are compared in the comparator. When the two compared state data coincide, the initial data stored in the initial data memory means is fed to code generating means by the generation control means, thus initializing the code generating means to generate the recurrence spreading codes from the forefront of the series.

That is, when its state data becomes coincident with the content stored in the reset data memory means, the code generating means is restored to the initial state, so that the length of the spreading code series can be set as desired according to the state data stored in the reset memory means. The restoration of the code generating means to the initial sate is controlled according to the data stored in the reset memory means and the initial data register, and it is thus not necessary for any counter to determine the timing of the restoration of the code generating means to the initial state.

When generating spreading codes from an intermediate locality of the series or then shifting the phase of the recurrence spreading codes, the controller causes proper preset data to be generated and stored in the preset data memory means and causes the timing generator to feed the preset data thus stored in the preset data memory means to the code generating means.

In this case, the code generating means generates a spreading code corresponding to preset data at a timing when the preset data is fed to it, and it thus subsequently generates recurrence spreading codes successively. Since proper preset data are generated and fed at proper timings to the code generating means, it is not necessary to control the counts of the counters for the spreading code phase control.

In the present invention, the various memory means may be those capable of storing various data, for instance registers or like data storing media formed as exclusive software and memory areas set in RAM (Random Access Memory) and like data storing media. Other various memory means may be such as to be formed to realize their functions, for instance exclusive hardware, computers with adequate software-mounted programs, functions realized in computer by adequate programs and combinations of these means.

Since the restoring of the code generating means to the initial state can be controlled according to the data stored in the reset data storing means and the initial data storing means, it is possible to prevent phase deviation of spreading codes due to phase deviation in any counter without need of determination of the timing of restoration of the code generating means to the initial state by any counter. Also, since the phases of the spreading codes are made variable in such a way that the preset data generated by the reset data generating means is fed by the generation control means to the code generator after being stored in the preset data storing means, fast spreading code phase control can be obtained in a simple processing without need of controlling any count in any counter for spreading code phase variation.

(3) The data processor according to the foregoing ( ), which further comprises: processing means for processing communication data according to spreading codes; and reset data updating means for updating state data stored in the reset data storing means according to the chip rate of communication data.

The reset data updating means thus updates the state data stored in the reset data storing means in accordance with the chip rate of communication data, and thus the length of the spreading code series is updated according to the communication data chip rate. The spreading means processes such communication data according to the spreading codes in the series having the updated length, and spread and despread of communication data are thus executed with adequate spreading codes corresponding to the chip rate.

The processing of communication data by the spreading means with spreading codes, permits, for instance, spread of communication data to be transmitted with spreading codes and also despread of received communication data with spreading codes.

The spreading code series length can be updated with updating of the state data according to the chip rate of communication data and without need of any counter control for realizing this, and thus it can be updated according to the chip rate of communication data in a simple processing.

(4) The data processor according to the foregoing (2), which further comprises: data input receiving means for receiving the input of communication data having been despread by spreading codes; despreading means for despreading the input communication data according to spreading codes generated by the code generating means; and phase detecting means for detecting recurrence phases of spreading codes of the input communication data; the preset data generating means generating preset data for causing the code generating means to generate spreading codes synchronized in phase to the spreading codes of the input communication data, and cause the generated preset data to be stored in the preset data storing means; the generation control means causing the preset data storing means to feed preset data to the code generating means with timings of generation of the spreading codes synchronized in phase to the spreading codes of the input communication data.

When communication data having been spread with spreading codes is fed to the data input receiving means, the phase detecting means detects the phase of recurrence of the spreading codes of the input communication data. In response to this detection, preset data is generated by the preset data generating means and stored in the reset data storing means. The generation control means causes the stored preset data to be fed at a proper timing to the code generating means.

The code generating means generates spreading codes synchronized in phase to the spreading codes of the input communication data, and the despreading means despreads the input communication data with the spreading codes thus generated. Thus, the communication data which was transmitted after being modulated with spreading codes is properly demodulated.

It is thus possible to generate spreading codes synchronized in phase to the spreading codes of the input communication data, and this can be realized without need of any counter control. Thus, communication data transmitted after modulation with spreading codes, can be demodulated by proper despread of it in a simple processing.

(5) The data processor according to the foregoing (4), which further comprises: chip rate detecting means for detecting the chip rate of the input communication data; and reset data updating means for updating the state data stored in the reset data storing means according to a detected chip rate.

Thus, the chip rate detecting means detects the chip rate of the input communication data which has been despread with spreading codes, and the reset data updating means updates the state data stored in the reset data storing means according to the detected chip data. The length of the spreading code series is thus updated according to the chip rate of the nut communication data.

It is thus possible to generate spreading codes of a series length corresponding to the chip rate of the input communication data, and this can be realized without need of any counter control. Thus, communication data transmitted at a predetermined chip rate after being modulated with spreading codes of a predetermined series length, can be demodulated by proper despread with spreading codes of a corresponding series length in a simple processing.

(6) A data transmitter for transmitting communication data after causing spread thereof according to recurrence spreading codes, the data transmitter comprising the data processor according to one of the foregoing (1) to (3). It is thus possible to obtain steady spread and transmission of communication data.

(7) A data receiver for causing despread of received communication data according to recurrence spreading codes, the data receiver comprising the data processor according to one of the foregoing (1) to (5). It is thus possible to obtain steady despread of communication data.

(8) A data communication system comprising: a data transmitter for transmitting communication data after causing spread thereof according to recurrence spreading codes; and a data receiver for despreading received communication data according to recurrence spreading codes; the data communication system comprising at least either the data transmitter according to claim 6 and the data receiver according to the foregoing (7). It is thus possible to obtain data communication with stable spread and despread. (9) A method of data processing in a data processor comprising code generating means for generating recurrence spreading codes comprising the steps of: preserving beforehand initial data for causing the code generating means to generate a forefront spreading code in a recurrence series of spreading codes and state data of the code generating means when restoring the forefront of the recurrence series of spreading codes; causing, when the preserved state data and actual state data of the code generating means coincide, the preserved initial data to be fed to the code generating means: generating preset data for causing the code generating means to generate a particular spreading code in correspondence to predetermined conditions; and causing the generated preset data to be fed to the code generating means with a variable timing after tentatively preserving the generated preset data.

Thus, when the code generating means for successively generating the recurrence spreading codes reaches a predetermined state corresponding to the state data, it is restored to the initial state. The length of the spreading code series is thus updated as desired according to the state data. Since the restoration of the code generating means to the initial state is controlled by data preservation, the timing of restoration of the code generating means to the initial state need not be determined by any counter.

Besides, when generating spreading codes from an intermediate locality of the series or when shifting the phase of the recurrence spreading codes, proper preset data is generated and fed at a proper timing to the code generating means, and it is thus not necessary to control any count of any counter for the spreading code phase control.

Since the restoration of the shift register to the initial state can be controlled according to the state data and initial data stored beforehand, it is possible to prevent phase deviation of spreading codes due to count deviation in any counter without need of determination of the timing of restoration of the shift register to the initial state by any counter. It is also possible to permit variation of the spreading code phase by having preset data generated and fed to the shift register. Fast spreading code phase control thus is obtainable in a simple processing without need of controlling any count in any counter.

(10) A medium having a program for executing the method as set forth in the foregoing (9).

Thus, when a program store in the above data storing medium is read out into the computer for the execution of the pertinent processing, the computer preserves initial data and state data beforehand and, when the preserved state data and actual state data of the shift register coincide, causes the preserved initial data to be fed to the shift register for initialization thereof and generation of the recurrence spreading codes from the forefront of the series.

In other words, when the shift register for successively generating the recurrence spreading codes reaches a predetermined state corresponding to the state data, it is restored to the initial state. The spreading code series length thus is set as desired according to the state data. Since the restoration of the shift register to the initial state is controlled according to the initial data and the state data, no timing of restoration of the shift register to the initial state need be determined by any counter.

Besides, when generating spreading codes from an intermediate locality of the series or when shifting the phase of the recurrence spreading codes, the controller causes proper reset data to be generated and stored in the preset data register, and causes the timing generator to feed the preset data thus stored in the preset data register to the shift register.

In this case, the shift register generates a spreading code corresponding to preset data at a timing when the preset data is fed to it, and it thus subsequently generates recurrence spreading codes successively. Since proper preset data are generated and fed at proper timings to the shift register, it is not necessary to control the contents of the counters for the spreading code phase control.

The data storing media in the present invention may be those, in which programs for the execution of various processing routines in the computer are stored beforehand, for instance a ROM or a HDD (Hard Disc Drive) secured to a system partly constituted by a computer, and a CD (Compact Disc)-ROM or FD (Floppy Disc) detachably mounted in a system partly constituted by a computer. Preservation of various data in the computer, permits storing various data in a RAM or like data storing medium connected beforehand to the computer or storing various data in a FD or the like, when this FD or the like is the data storing medium in the present invention.

When the computer is caused to read programs and execute corresponding processings, it can control the restoration of the shift register to the initial state according to the state and initial data stored beforehand. It is thus possible to prevent phase deviation of spreading codes due to count deviation in any counter without need of determination of the timing of restoration of the shift register to the initial state by any counter. It is also possible to permit spreading code phase variation by having present data generated and fed to the shift register. Fast spreading code phase control thus can be obtained in a simple processing without need of controlling any count in any counter for despreading code phase variation.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A data processor comprising:
   a shift register for generating recurrence spreading codes:
   an initial data register, in which initial data for causing the shift register to generate a forefront spreading code in a recurrence spreading code series is stored beforehand;
   a preset data register for updatably and tentatively storing preset data for causing the shift register to generate a particular spreading code;
   a reset data register, in which state data of the shift register when restoring the forefront of the recurrence spreading code series is stored beforehand;
   a selector for selectively supplying the initial data stored in the initial data register and the preset data stored in the preset data register to the shift register;
   a comparator for comparing the state data stored in the reset data register and actual state data of the shift register;
   a timing generator for controlling, when the two compared state data coincide, the selector for causing the initial data stored in the initial data register to be supplied to the shift register; and
   a controller for causing state data to be generated and stored in the reset data register, causing initial data to be stored in the initial data register, causing preset data to be generated and stored in the preset data register, and then causing the timing generator to feed the stored reset data to the shift register.

2. A data processor comprising:
   code generating means for generating recurrence spreading codes;
   initial data memory means for storing initial data for causing the code generating means to generate a forefront spreading code in a recurrence series of spreading codes;
   reset data memory means, in which state data of the code generating means when restoring the forefront of the recurrence series of spreading codes is stored beforehand;
   generation starting means for causing, when the state data stored in the reset data storing means and actual state data of the code generating means coincide, the initial data stored in the initial data memory means to be fed to the code generating means;
   reset data storing means for generating state data in correspondence to predetermined conditions and storing the state data in the reset data memory means;
   initial data storing means for storing initial data in the initial data memory means;
   preset data generating means storing preset data in correspondence to predetermined conditions and causing the generated preset data to be stored in the preset data storing means; and
   generation control means for causing preset data stored in the preset data storing means to be fed to the code generating means with a variable timing.

3. The data processor according to claim 2, which further comprises:
   processing means for processing communication data according to spreading codes; and
   reset data updating means for updating state data stored in the reset data storing means according to the chip rate of communication data.

4. The data processor according to claim 2, which further comprises:
   data input receiving means for receiving the input of communication data having been spread by spreading codes;
   despreading means for despreading the input communication data according to spreading codes generated by the code generating means; and
   phase detecting means for detecting recurrence phases of spreading codes of the input communication data;
   the preset data generating means generating preset data for causing the code generating means to generate spreading codes synchronized in phase to the spreading codes of the input communication data, and cause the generated preset data to be stored in the preset data storing means;
   the generation control means causing the preset data storing means to feed preset data to the code generating means with timings of generation of the spreading codes synchronized in phase to the spreading codes of the input communication data.

5. The data processor according to claim 4, which further comprises:
   chip rate detecting means for detecting the chip rate of the input communication data; and
   reset data updating means for updating the state data stored in the reset data storing means according to a detected chip rate.

6. A data transmitter for transmitting communication data after causing spread thereof according to recurrence spreading codes, the data transmitter comprising the data processor according to claim 1.

7. A data receiver for causing despread of received communication data according to recurrence spreading codes, the data receiver comprising the data processor according to claim 1.

8. A data communication system comprising:

a data transmitter for transmitting communication data after causing spread thereof according to recurrence spreading codes; a and a data receiver for despreading received communication data according to recurrence spreading codes;

the data communication system comprising at least either the data transmitter according to claim 6 or the data receiver according to claim 7.

9. A method of data processing in a data processor comprising code generating means for generating recurrence spreading codes comprising the steps of:

preserving beforehand initial data for causing the code generating means to generate a forefront spreading code in a recurrence series of spreading codes and state data of the code generating means when restoring the forefront of the recurrence series of spreading codes;

causing, when the preserved state data and actual state data of the code generating means coincide, the preserved initial data to be fed to the code generating means:

generating preset data for causing the code generating means to generate a particular spreading code in correspondence to predetermined conditions; and causing the generated preset data to be fed to the code generating means with a variable timing after tentatively preserving the generated preset data.

10. A medium having a program for executing the method as set forth in claim 9.

11. A data transmitter for transmitting communication data after causing spread thereof according to recurrence spreading codes, the data transmitter comprising the data processor according to claim 2.

12. A data transmitter for transmitting communication data after causing spread thereof according to recurrence spreading codes, the data transmitter comprising the data processor according to claim 3.

13. A data receiver for causing despread of received communication data according to recurrence spreading codes, the data receiver comprising the data processor according to claim 2.

14. A data receiver for causing despread of received communication data according to recurrence spreading codes, the data receiver comprising the data processor according to claim 3.

15. A data receiver for causing despread of received communication data according to recurrence spreading codes, the data receiver comprising the data processor according to claim 4.

16. A data receiver for causing despread of received communication data according to recurrence spreading codes, the data receiver comprising the data processor according to claim 5.

\* \* \* \* \*